(12) United States Patent
Ho

(10) Patent No.: US 8,884,898 B2
(45) Date of Patent: Nov. 11, 2014

(54) TOUCH SENSING DEVICE AND TOUCH SENSING METHOD THEREOF

(75) Inventor: Ming-Yu Ho, Hsinchu County (TW)

(73) Assignee: Innovation & Infinity Global Corp., Hsinchu (TW)

( * ) Notice: Subject to any disclaimer, the term of this patent is extended or adjusted under 35 U.S.C. 154(b) by 393 days.

(21) Appl. No.: 13/451,096

(22) Filed: Apr. 19, 2012

(65) Prior Publication Data

US 2013/0278508 A1 Oct. 24, 2013

(51) Int. Cl.
*G06F 3/041* (2006.01)

(52) U.S. Cl.
USPC .................................................. 345/173

(58) Field of Classification Search
USPC .......... 345/173–178; 178/18.03–18.07, 18.09
See application file for complete search history.

(56) References Cited

U.S. PATENT DOCUMENTS

| | | | | |
|---|---|---|---|---|
| 5,748,182 | A * | 5/1998 | Ohashi et al. | 345/173 |
| 2001/0033272 | A1 * | 10/2001 | Yoshimura et al. | 345/173 |
| 2004/0021645 | A1 * | 2/2004 | Kobayashi et al. | 345/173 |
| 2011/0102353 | A1 * | 5/2011 | Kim et al. | 345/173 |
| 2012/0092028 | A1 * | 4/2012 | Lee et al. | 324/658 |

* cited by examiner

*Primary Examiner* — Chanh Nguyen
*Assistant Examiner* — Roy Rabindranath
(74) *Attorney, Agent, or Firm* — Li & Cai Intellectual Property (USA) Office

(57) ABSTRACT

A touch sensing device is provided. The provided touch sensing device may include a touch sensing circuit having a conducting unit for generating an alternating current (AC) touch signal, a phase delaying circuit electrically coupled to the touch sensing circuit for receiving the AC touch signal and delaying the AC touch signal for a predetermined phase so as to derive a delayed signal, and a determination circuit electrically coupled to the touch sensing circuit and the phase delaying circuit for comparing intensities of the delayed signal and the AC touch signal with a predetermined threshold in order to derive a waveform-overlapping time period. When the waveform-overlapping time period is longer than a predetermined period, the determination circuit concludes the conducting unit is approached or contacted by the conductor.

6 Claims, 4 Drawing Sheets

TOUCH SENSING DEVICE AND TOUCH SENSING METHOD THEREOF

BACKGROUND OF THE INVENTION

1. Field of the Invention

The instant disclosure relates to a touch sensing device, and more particularly, to a touch sensing device capable of sensing an alternating current (AC)-based signal of a human body and a touch sensing method thereof.

2. Description of Related Art

Currently-existing touch sensing devices that have been gradually replaced traditional input means could be categorized into different types including resistance-based and capacitance-based. The resistance-based touch sensing device is configured to detect the variation in voltages of sensing electrodes of the touch sensing device when the latter is touched. The capacitance-based touch sensing device at the same time is adapted to sense the variation in capacitance as the result of the current generated by the contact of a human operator. Other touch sensing devices such as optical touch sensing device and acoustic sensing device rely on whether lights and sound waves are blocked or absorbed for the purpose of locating touch positions.

However, when it comes to determining whether the touch sensing device is touched or contacted the currently-existing technology still has a lot to be desired.

SUMMARY OF THE INSTANT DISCLOSURE

The primary objective of the instant disclosure is to provide a touch sensing device. The provided touch sensing device is capable of sensing weak small signals of the human operator in an environment with electronic equipment.

The touch sensing device may include a touch sensing circuit having a conducting unit for generating an alternating current (AC) touch signal, a phase delaying circuit electrically coupled to the touch sensing circuit for receiving the AC touch signal and delaying the AC touch signal for a predetermined phase so as to derive a delayed signal, and a determination circuit electrically coupled to the touch sensing circuit and the phase delaying circuit for comparing intensities of the delayed signal and the AC touch signal with a predetermined threshold in order to derive a waveform-overlapping time period. When the waveform-overlapping time period is longer than a predetermined period, the determination circuit concludes the conducting unit is approached or contacted by the conductor.

The instant disclosure further provides a touch sensing method applied in a touch sensing device having a conducting unit, which is adapted to generate an alternating current (AC) touch signal when the conducting unit is within a predetermined distance from a conductor carrying electrons. The disclosed method may include retrieving the AC touch signal, delaying the retrieved AC touch signal for a predetermined phase to derive a delayed signal, comparing intensities of the delayed signal and the AC touch signal with a predetermined threshold in order to derive a waveform-overlapping time period during which the delayed signal and the AC touch signal overlap and the intensities thereof are larger than the predetermined threshold, and determining whether the waveform-overlapping time period is longer than a predetermined period.

The conducting unit may be utilized to couple the small signals of the human operator so as to sense the same.

In order to further the understanding regarding the instant disclosure, the following embodiments are provided along with illustrations to facilitate the disclosure of the instant disclosure.

DETAILED DESCRIPTION OF THE EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

When a human operator is in the surrounding of electronic equipment, the human operator could carry an AC-based signal because of the conductivity of the human body and the electrical coupling between the human body and an AC power source of the electronic equipment. In the presence of a conducting object, the AC-based signal associated with the human operator may directly or indirectly couple with the conducting object. Such coupling between the human operator and the conducting object may enhance when the human body is in the proximity of the conducting object. Thus, when the human operator is in the neighborhood of a receiving end of a touch sensing device by properly sensing the AC-based signal of the human operator may help facilitate the touch sensing of the touch sensing device.

Figure 1A:
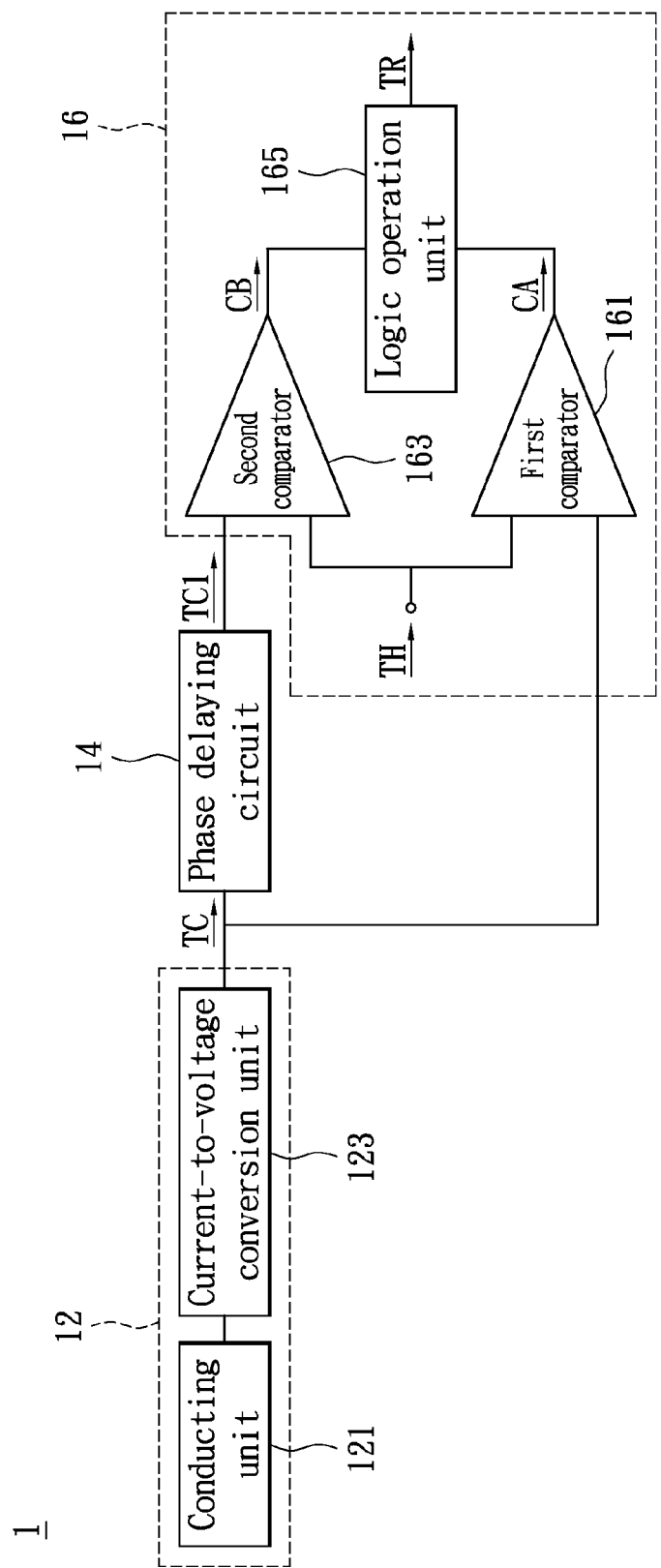
FIG. 1A illustrates a simplified circuit block diagram of a touch sensing device according to one embodiment of the instant disclosure.

Please refer to FIG. 1A illustrating a simplified circuit block diagram of a touch sensing device 1 according to one embodiment of the instant disclosure. The touch sensing device 1 may include a touch sensing circuit 12, a phase delaying circuit 14 electrically coupled to the touch sensing circuit 12, and a determination circuit 16 electrically coupled to both the phase delaying circuit 14 and the touch sensing circuit 12. The phase delaying circuit 12 may further include a conducting unit 121 and a current-to-voltage conversion unit 123, while the determination circuit 16 may further include a first comparator 161 configured to output a comparison signal CA, a second comparator 163 configured to output another comparison signal CB, and a logic operation unit 165.

The current-to-voltage conversion unit 123 may be electrically coupled between the conducting unit 121 and the phase delaying unit 14, with the first comparator 161 electrically coupled to the current-to-voltage conversion unit 123, the second comparator 163 electrically coupled to the phase delaying unit 14, and the logic operation unit 165 electrically coupled to the first comparator 161 and the second comparator 163.

Figure 1B:
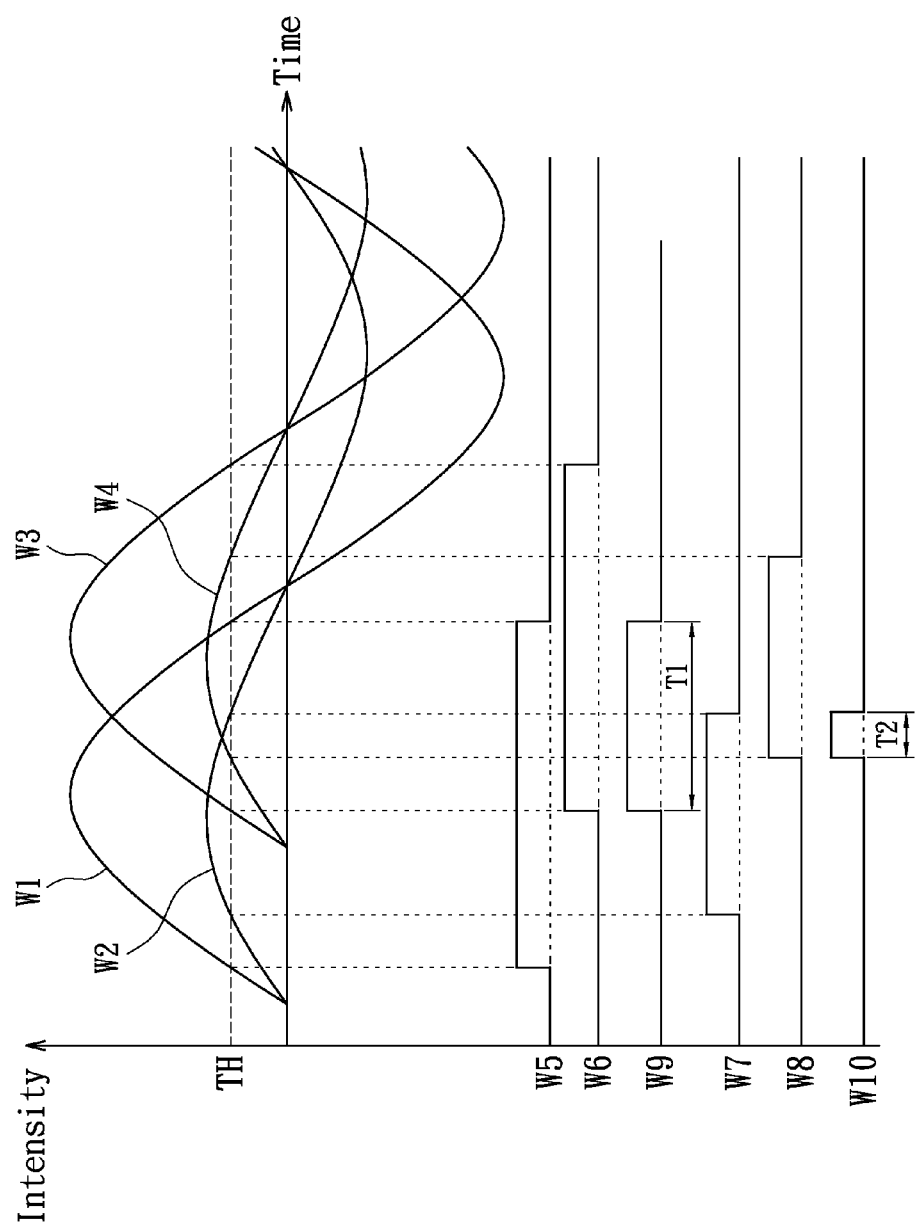
FIG. 1B shows a signal waveform of the touch sensing device according to one embodiment of the instant disclosure.

Please refer to both FIGS. 1A and 1B. FIG. 1B shows a signal waveform of the touch sensing device according to one embodiment of the instant disclosure. The conducting unit 121 of the touch sensing unit 12 may be configured to generate an AC touch signal when the human operator is within a predetermined distance (e.g., 3 mm) of the conducting unit 121. The AC touch signal generated by the conducting unit 121 may be in the form of a current, which may result from the AC-based signal carried by the human operator, when the human operator approaches or is in contact with the touch sensing unit 121. And such current-based AC touch signal may be further transmitted to the current-to-voltage conversion unit 123 without the human operator being in contact with the conducting unit 121 so long as the former is within the predetermined distance from the latter. It is worth noting that the intensity of the AC touch signal (or the value of the current-based AC touch signal) may vary depending on the distance between the human operator and the conducting unit 121 despite the human operator has already been within the predetermined distance from the conducting unit 121.

The current-to-voltage conversion unit 123 may convert the current-based AC touch signal from the conducting unit 121 to a corresponding voltage-based AC touch signal TC, before further transmitting the voltage-based AC touch signal TC to the phase delaying circuit 14 and the first comparator 161. A waveform W1 in FIG. 1B represents the AC touch signal TC when the human operator is within the predetermined distance from the conducting unit 121 or in contact with the same, while another waveform W2 is indicative of the AC touch signal TC when the human operator is more than the predetermined distance from the conducting unit 121. It is worth noting that when the human operator is outside the predetermined distance from the conducting unit 121 the AC touch signal in terms of the waveform W2 may result from environmental noises, with the AC touch signal varying significantly and represented in terms of the waveform W1 after the human operator is within the predetermined distance from the conducting unit 121 or is in contact with the same.

The phase delaying circuit 14 may receive the AC touch signal TC from the touch sensing circuit 12 before delaying the AC touch signal TC for a predetermined phase in order to derive a delayed signal TC1, which may be represented by both waveforms W3 and W4. Specifically, the waveform W3 may stand for the delayed signal TC1 when the human operator is within the predetermined distance from the conducting unit 121 or in contact with the same. The waveform W4, meanwhile, may stand for another delayed signal TC1 in the event that the human operator is not within the predetermined distance from the conducting unit 121.

The determination circuit 16 may compare intensities of the AC touch signal TC and the delayed signal TC1 with a predetermined threshold TH in order to derive a waveform-overlapping time period. In one implementation, the predetermined threshold TH may be adjustable and generated from a voltage divider. That the threshold TH is adjustable may help adjust the sensitivity of the determination circuit 16 determining whether the human operator is within the predetermined distance from the conducting unit 121 or in contact with the same. The waveform-overlapping time period may be a time period during which the AC touch signal TC and the delayed signal TC1 overlap and the intensities of both TC and TC1 are larger than the predetermined threshold TH.

When the waveform-overlapping time period is longer than a predetermined period, the determination circuit 16 may conclude that the conducting unit 121 and the human operator may be away from each other not farther than the predetermined distance or the conducting unit 121 may be contacted by the human operator. On the other hand, when the waveform-overlapping time period is not longer than the predetermined period the determination circuit 16 may conclude the conducting unit 121 is not contacted by the human operator or is away from the human operator farther than the predetermined distance. An output signal TR from the logic operation unit 165 may represent the waveform-overlapping time period on basis of which any further touch sensing operation may be performed.

When the human operator is in contact with the conducting unit 121 or within the predetermined distance from the same, the first comparator 161 may compare the AC touch signal TC (i.e., the waveform W1) and the threshold TH before outputting a comparison signal W5, which may be set to a first signal level at the time the intensity of the AC touch signal TC is larger than the threshold TH. The comparison signal W5 may be set to a second signal level when the AC touch signal TC is not larger than the threshold TH. The second comparator 163 may further compare the delayed signal TC1 (i.e., the waveform W3) and the threshold TH, so that another comparison signal W6 may be outputted. The comparison signal W6 may be at the first signal level when the intensity of the delayed signal TC1/W3 is larger than the threshold TH, while the comparison signal W6 may be at the second signal level when TC1/W3 is not larger than the threshold TH3. The logic operation unit 165 may perform a logic operation on both the comparison signals W5 and W6 in order to derive the waveform-overlapping time period T1, which may be represented in terms of another signal W9 in FIG. 1B. Specifically, in one implementation, the waveform-overlapping time period T1 may indicate that both the comparison signals W5 and W6 are at the first signal level, which may be a high voltage level.

Similarly, when the human operator is not within the predetermined distance from the conducting unit 121, the first comparator 161 and the second comparator 163 may be configured to compare both the AC touch signal TC (i.e., the waveform W2) and the delayed signal (i.e., the waveform W4) with the threshold TH before outputting comparison signals W7 and W8, respectively. When the intensity of TC/W2 is larger than TH, W7 is set to the first signal level. Otherwise, W7 is set to the second signal level. W8 may be at the first signal level also when TC1/W4 is larger than TH, with W8 set to the second signal level at the time TC1/W4 is not larger than TH.

The logic operation unit 165 may perform another logic operation on both W7 and W8 in order to derive the waveform-overlapping time period T2 in terms of a waveform W10 in FIG. 1B. The waveform-overlapping time period T2 may indicate that both W7 and W8 are at the first signal level. From FIG. 1B, when the difference lies between T1 and T2 is more significant that the human operator is within the predetermined distance from the conducting unit 121 or in contact with the same may become easier to be determined. It is worth noting that the predetermined period may be between T1 and T2 in length.

The example determination may rely on the waveforms TC and TC1 at their positive and the negative half-periods. When the negative half-period of the waveform TC and TC1 are utilized, the predetermined threshold TH may be set to a negative value.

Figure 2:
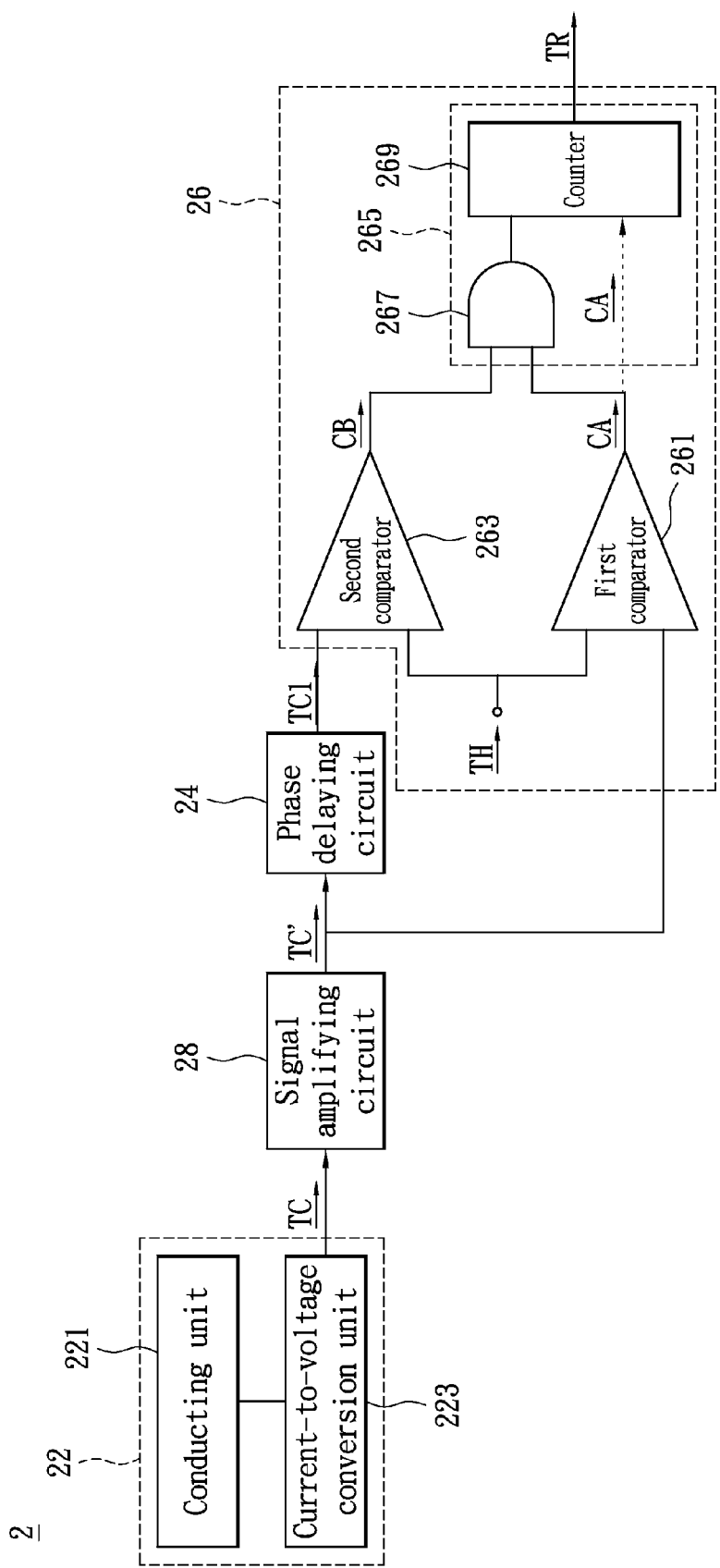
FIG. 2 is a simplified circuit block diagram of another touch sensing device 2 according to another embodiment of the instant disclosure.

FIG. 2, meanwhile, is a simplified circuit block diagram of another touch sensing device 2 according to another embodiment of the instant disclosure. The touch sensing device 2 may include a touch sensing circuit 22, a phase delaying circuit 24, a determination circuit 26, and a signal amplifying circuit 28. The touch sensing circuit 22 may further include at least one conducting unit 221 and a current-to-voltage conversion unit 223. The determination circuit 26 may further include a first comparator 261, a second comparator 262, and a logic operation unit 265 having an AND logic unit 267 and a counter 269.

Compared with the touch sensing device 1 shown in FIG. 1A, the touch sensing device 2 may include the signal amplifying circuit 28 with the logic operation unit 265 implemented by the AND logic unit 267 and the counter 269. The signal amplifying circuit 28 may be electrically coupled to the current-to-voltage conversion unit 223, the phase delaying circuit 24, and the first comparator 261, for amplifying the voltage-based AC touch signal TC outputted by the current-to-voltage conversion unit 223 and transmitting the amplified voltage-based AC touch signal TC' to the phase delaying circuit 24 and the first comparator 261.

In conjunction with FIG. 1B, the AND logic unit 267 may be electrically coupled to both the first comparator 261 and the second comparator 263 so as to perform an AND operation on comparison signals CA and CB in order to derive the waveform-overlapping signals W9 and W10. The counter 269, meanwhile, may be electrically coupled to the AND logic unit 267, for deriving the waveform-overlapping time periods T1 and T2 by calculating the time period during which both the waveform-overlapping signals W9 and W10 are at the first signal level. In one implementation, the calculation of the time period during which W9 and W10 are at the first signal level may be based on the counter 269 counting the length of the time period during which the output of the AND logic unit 267 could enable (e.g., at the high signal level). In another implementation, the counter 269 may start counting upon the receipt of the comparison signal CA at the high signal level.

Figure 3:
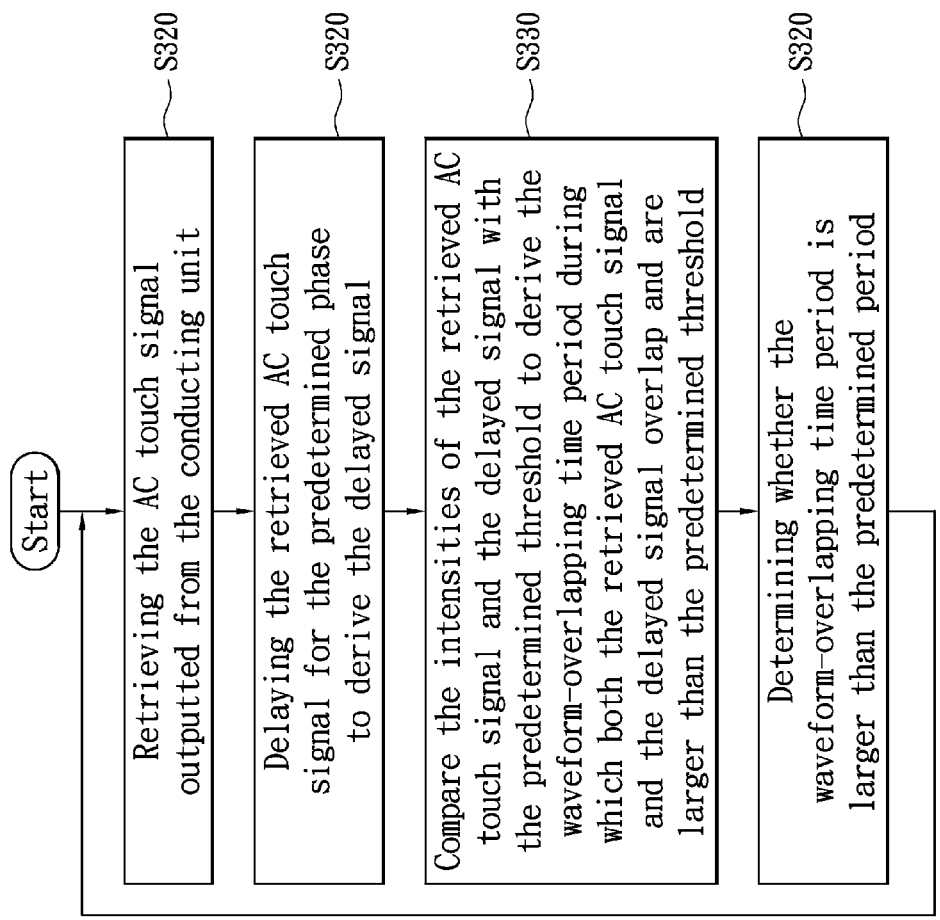
FIG. 3 illustrates a flow of a touch sensing method according to one embodiment of the instant disclosure.

FIG. 3 illustrates a flow chart of a touch sensing method that may be applicable to the touch sensing device 1 according to one embodiment of the instant disclosure. As previously mentioned, the touch sensing device 1 may include at least one conducting unit, which may be configured to generate the AC touch signal when the human operator is within the predetermined distance from the conducting unit or even in contact with the same.

The touch sensing method may include retrieving the AC touch signal outputted from the conducting unit 121 in step S310. The retrieved AC touch signal 121 may be further amplified by the signal amplifying circuit 28 in FIG. 2.

And in step S320 the method may delay the AC touch signals such as W1 and W2 for a predetermined phase in order to derive the delayed signals W3 and W4. The method may further compare the intensities of the AC touch signals and the delayed signals with the predetermined adjustable threshold TH for deriving the waveform-overlapping time periods T1 and T2 in step S330. And in step S340 the method may further determine whether the waveform-overlapping time periods are larger than the predetermined period. If so, it may be determined that the human operator is within the predetermined distance from the conducting unit 121 or in contact with the same. Otherwise, the human operator may not be within the predetermined distance from the conducting unit 121. It is worth noting that when the human operator is not within the predetermined distance from the conducting unit 121 the human operator in no event would be in contact with the same. After the completion of step S340 the flow of the method may return to step S310.

In short, the instant disclosure is directed to a touch sensing device and a touch sensing method thereof. The disclosed touch sensing device may employ the conducting unit to sense the AC-based signal from the human operator that may be originating from the electronic equipment. And delaying the AC touch signal for the predetermined phase may help increase the sensitivity of determining whether the human operator is within the predetermined distance from the touch sensing device or is in contact with the same. The logic operation may be performed when the AC touch signal is at its positive half-period or negative half-period and amplifying the AC touch signal before the same is delayed for the predetermined phase may help the subsequent logic operations.

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A touch sensing device, comprising:
    a touch sensing circuit, having a conducting unit for generating an alternating current (AC) touch signal when the conducting unit is within a predetermined distance from a conductor carrying electrons;
    a phase delaying circuit, electrically coupled to the touch sensing circuit, for receiving the AC touch signal from the touch sensing circuit and delaying the AC touch signal for a predetermined phase so as to derive a delayed signal; and
    a determination circuit, electrically coupled to the touch sensing circuit and the phase delaying circuit, for comparing intensities of the delayed signal and the AC touch signal with a predetermined threshold in order to derive a waveform-overlapping time period during which the delayed signal and the AC touch signal overlap and the intensities thereof are larger than the predetermined threshold;
    wherein when the waveform-overlapping time period is longer than a predetermined period the determination circuit concludes the conducting unit is approached or contacted by the conductor carrying the electrons, otherwise the determination circuit concludes the conductor carrying the electrons fails to contact or be approaching the conducting unit.

2. The device according to claim 1, wherein the touch sensing circuit further comprises a current-to-voltage conversion unit electrically coupled between the conducting unit and the phase delaying circuit, for converting a current signal from the conducting unit to the AC touch signal in terms of a voltage.

3. The device according to claim 2, wherein the determination circuit further comprises:
    a first comparator electrically coupled to the current-to-voltage conversion unit, for comparing the AC touch signal and the predetermined threshold before generating a first comparison signal, which is set to a first signal level when the intensity of the AC touch signal is larger than the predetermined threshold and set to a second signal level when the intensity of the AC touch signal is not larger than the predetermined threshold;
    a second comparator electrically coupled to the phase delaying circuit, for comparing the delayed signal with the predetermined threshold before generating a second comparison signal, which is set to the first signal level when the intensity of the delayed signal is larger than the predetermined threshold and set to the second signal level when the intensity of the delayed signal is not larger than the predetermined threshold; and
    a logic operation unit electrically coupled to the first comparator and the second comparator, for operating on the first comparison signal and the second comparison signal to derive the waveform-overlapping time period during which both the first comparison signal and the second comparison signal are at the first signal level.

4. The device according to claim 3, further comprising a signal amplifying circuit electrically coupled to the current-to-voltage conversion unit, the phase delaying circuit, and the first comparator, for amplifying the AC touch signal in terms of the voltage generated by the current-to-voltage conversion unit and transmitting the amplified AC touch signal to the phase delaying circuit and the first comparator.

5. The device according to claim 3, wherein the logic operation unit further comprises:
- an AND logic unit, electrically coupled to the first comparator and the second comparator, for performing an AND operation on the first comparison signal and the second comparison signal to derive a waveform-overlapping signal; and
- a counter, electrically coupled to the AND logic unit, for counting a period length of the waveform-overlapping signal continuing being at the first signal level to derive the waveform-overlapping time period.

6. A touch sensing method applied in a touch sensing device having a conducting unit, which is adapted to generate an alternating current (AC) touch signal when the conducting unit is within a predetermined distance from a conductor carrying electrons, comprising:
- retrieving the AC touch signal;
- delaying the retrieved AC touch signal for a predetermined phase to derive a delayed signal;
- comparing intensities of the delayed signal and the AC touch signal with a predetermined threshold in order to derive a waveform-overlapping time period during which the delayed signal and the AC touch signal overlap and the intensities thereof are larger than the predetermined threshold; and
- determining whether the waveform-overlapping time period is longer than a predetermined period.

* * * * *